Jan. 24, 1967     F. W. NOLLER ET AL     3,300,172
MULTIPLE POSITION SEAT FOR MATERIAL HANDLING EQUIPMENT

Filed March 18, 1965     2 Sheets-Sheet 1

INVENTORS
FRED W. NOLLER &
ROY E. HAUFF
BY Tweedale & Gerhardt
ATTORNEYS

INVENTORS
FRED W. NOLLER &
ROY E. HAUFF
BY Tweedale & Gerhardt
ATTORNEYS

United States Patent Office 3,300,172
Patented Jan. 24, 1967

3,300,172
MULTIPLE POSITION SEAT FOR MATERIAL HANDLING EQUIPMENT
Fred W. Noller, Farmington, and Roy E. Hauff, St. Clair Shores, Mich., assignors to Massey-Ferguson Inc., Detroit, Mich.
Filed Mar. 18, 1965, Ser. No. 440,738
3 Claims. (Cl. 248—425)

This invention relates generally to seats, and is particularly concerned with multiple position seats for vehicle mounted material handling equipment wherein the seat may be moved from a driving position to an equipment operating position.

In material handling equipment such as tractor mounted backhoes, the operator sits in a forwardly facing position to drive the tractor, and in a rearwardly facing position to operate the backhoe controls. Usually, the forwardly facing driving position is lower than that required for the rearwardly facing backhoe operating position, the latter position being raised to give the operator good visibility of the backhoe during its operation.

It is therefore an object of this invention to provide a seat assembly wherein the seat can be moved selectively between oppositely facing vertically spaced positions.

A further object is to provide a multiple position seat assembly wherein the seat can be moved selectively between oppositely facing, vertically spaced positions, and wherein the seat is not subject to being accidentally moved from either position.

Still another object is to provide a multiple position seat assembly having a base member movable between vertically and horizontally spaced positions with a seat mounted on the base member for movement between a plurality of selected positions relative to the base.

Still another object is to provide a multiple position seat assembly for backhoes and similar material handling apparatus that is economical to manufacture, has a minimum number of parts and can be operated with a minimum amount of skill and effort.

In achievement of the foregoing, and other objects, a seat assembly according to the present invention includes a frame having horizontally spaced upper and lower support members formed thereon. A base member is connected with the frame by links in such a manner that the base member can be moved selectively between a lower position resting on the lower support member and upper position resting on the upper support member. When the base member is on the lower support member, the links are disposed substantially horizontally along the frame and move upwardly about their pivotal connections with the frame to move the base member to the upper support member. When the base member is seated on the upper support, the links are inclined such that upward movement of the links is required in order to remove the base member back to the lower support.

Mounted on the base member for rotation about a vertical axis is a seat supporting frame member such that the seat can be moved between oppositely facing positions when on the upper and lower supports, respectively. A latch member is provided to lock the seat supporting frame in selected positions on the base member, a release lever being provided to permit the seat supporting frame to rotate on the base member.

Other objects, advantages and features of the invention will become apparent from the following description taken in connection with the accompanying drawings in which.

While a specific embodiment of the invention is described and illustrated in the foregoing specification and accompanying drawings, it will be apparent to those skilled in the art that other forms may be adopted without departing from the scope and spirit of the invention.

Figure 1:
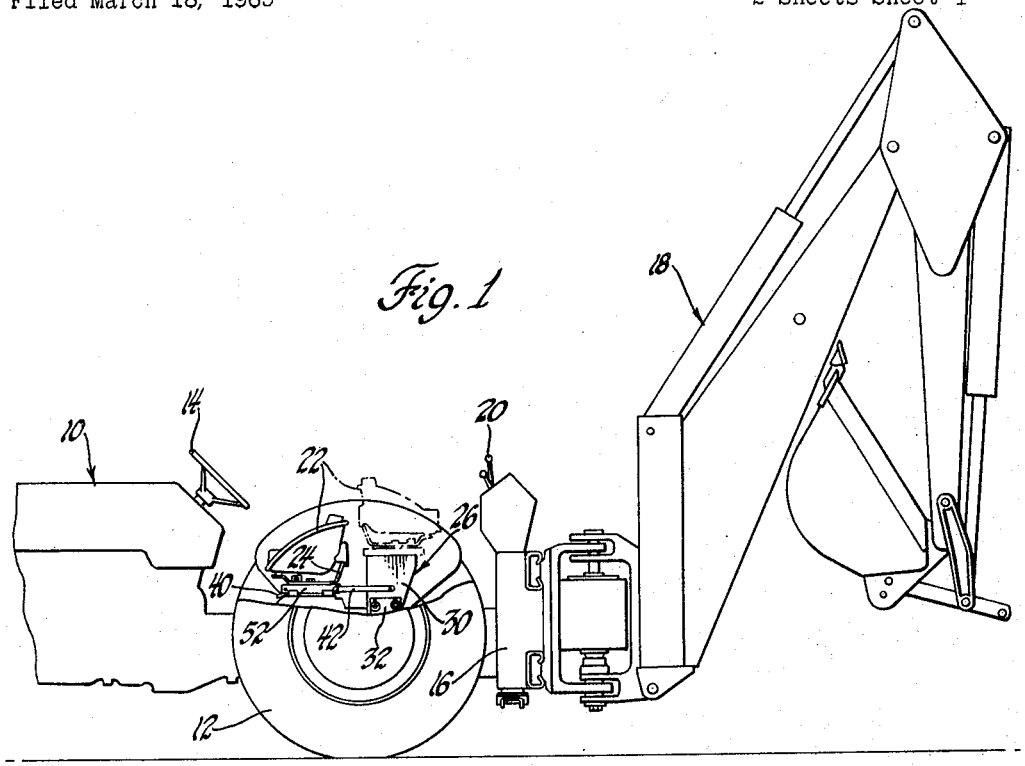
FIG. 1 is a partial elevation view of a tractor mounted backhoe having a seat assembly embodying the invention.

FIG. 1 illustrates a tractor 10 having rear wheels 12 and a steering wheel 14. Mounted on the rear end of tractor 10 is a supporting frame 16 for a backhoe designated collectively by reference numeral 18. Backhoe 18 is operated hydraulically by manipulation of control handles 20 supported above frame 16. Mounted on the tractor frame is a seat 22 for the operator which is shown in solid lines in its forwardly facing tractor driving position, and in phantom lines in its rearwardly facing, backhoe operating position.

With reference to FIGS. 2, 3, 4 and 5, seat 22 is supporting on a multi-position assembly including a frame secured to the tractor and designated generally by reference numeral 24. Frame 24 includes an inverted U-shaped member 26 defining an upper horizontal support 28 extending between depending sides or legs 30. Legs 30 are secured at their lower ends by bolts 34 to support plates 32 attached to the tractor chassis. A plurality (in this case 4) of guide elements 36 are welded onto the upper support 28 along each side thereof.

Projecting from the space between legs 30 of the U-shaped frame member 26 is an inclined plate 38 which is welded to the inner sides of legs 30. Extending from the lower end of the inclined plate 38 and formed integrally therewith is a lower, horizontal support member 40 which rests on the tractor frame as shown in outline in FIG. 2. Support member 40 is spaced forwardly and vertically from the upper support member 28.

Mounted on opposite sides of the inverted U-shaped member 26 is a pair of rear links 42 having their lower ends secured to legs 30 by means of coaxial pivot pins 44. A pair of forward links 46 have their lower ends pivotally connected on opposite sides of the lower support member 40 by means of coaxial pivot pins 48 mounted in brackets 50 projecting from the upper surface of the lower support member 40.

Figure 2:
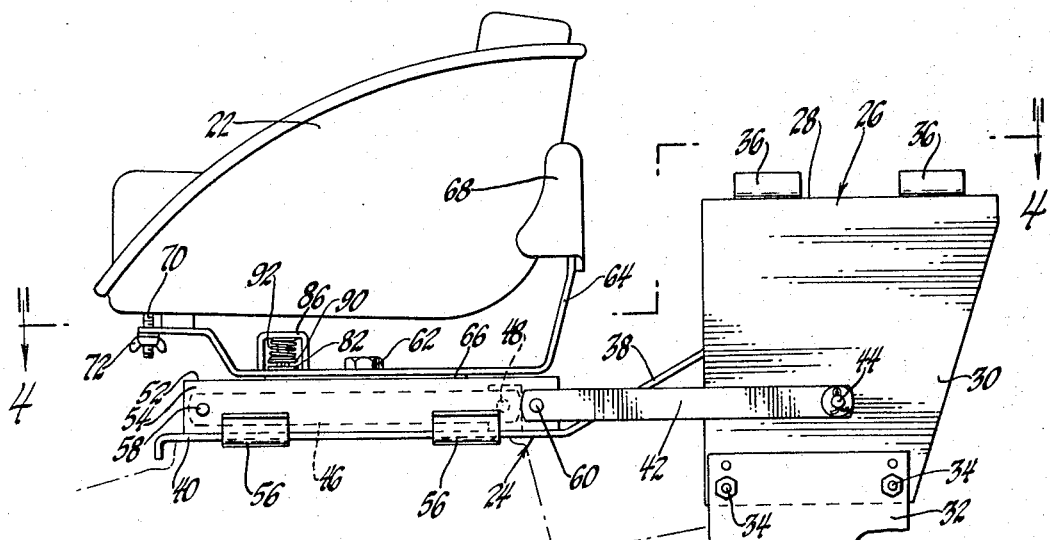
FIG. 2 is an elevational view of the seat assembly of FIG. 1.
Figure 3:
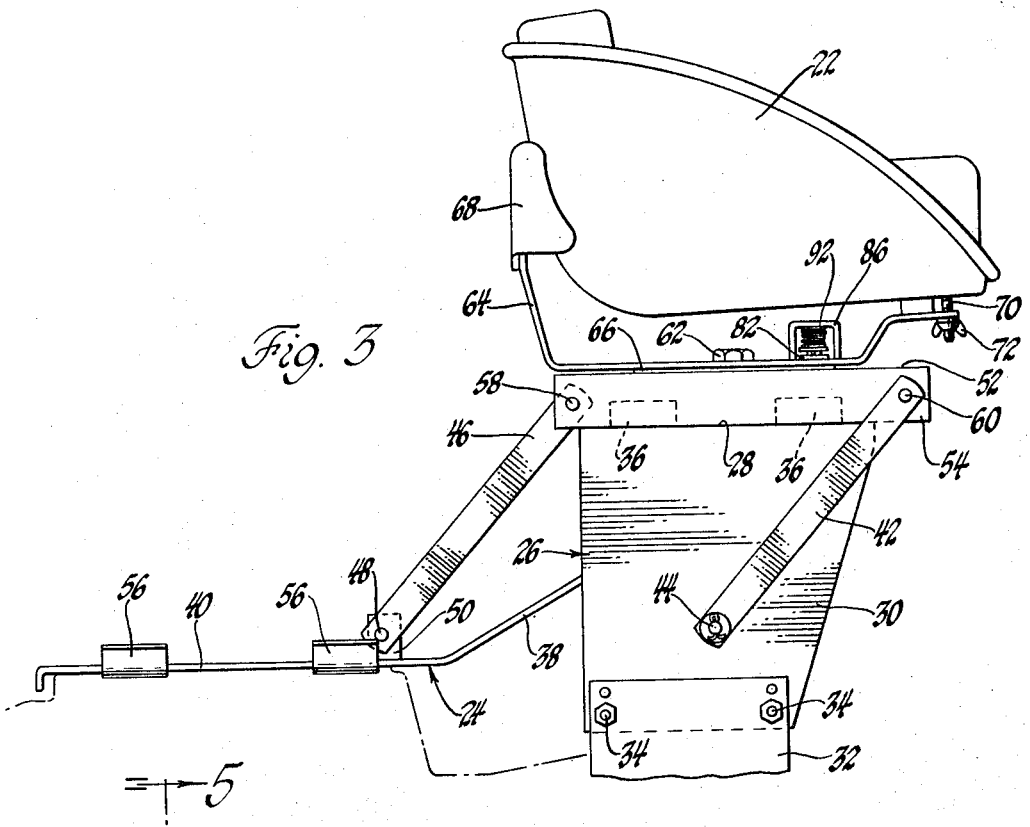
FIG. 3 is a view similar to FIG. 2 with the seat shown in an alternate position.
Figure 4:
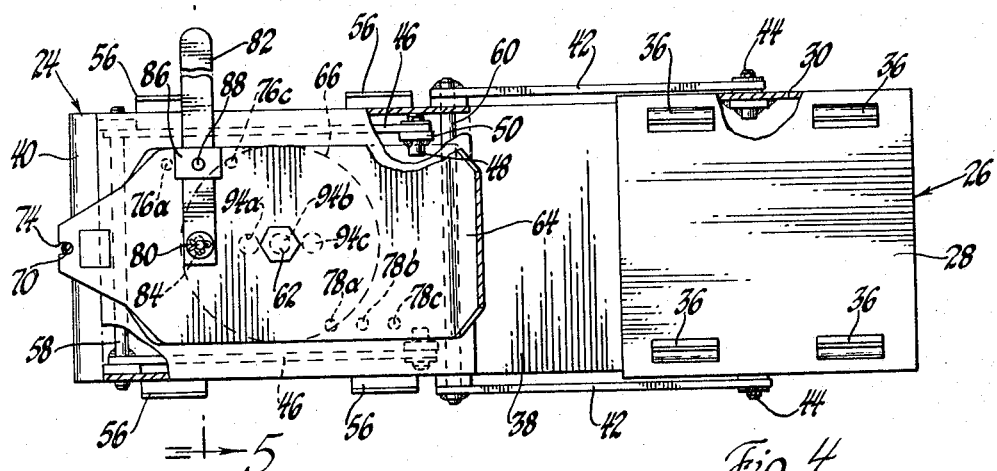
FIG. 4 is a sectional plan view taken on line 4—4 of FIG. 2.

As shown in FIGS. 2 and 4, a base member 52 having depending sides 54 rests on the lower support 40 between a plurality (in this case 4) of upstanding guide members 56 welded to the sides of the lower support 40. The upper ends of links 46 and 42 are pivotally connected with base member 52 by rods 58 and 60, respectively. The forward and rear links 46 and 42, respectively, are pivotally connected between the frame 24 and base member 52 in parallel relationship for carrying the base member between the position shown in FIG. 2 in which it rests on lower support 40 and the position shown in FIG. 3 in which it rests on the upper support 28 with guide members 36 engaging the inner sides of the depending sides 54.

As shown in FIG. 3, links 42 and 46 are inclined upwardly and rearwardly or toward the right such that return movement of base member 52 to the lower support 40 requires upward pivotal movement of the links about their lower pivot points 44 and 48. When the base member rests on the lower support, the links are disposed substantially horizontally along frame 24.

Centrally mounted on base member 52 is a vertical pivot bolt 62 on which is rotatably mounted a seat carrying frame 64. Interposed between the seat carrying frame 64 and the upper surface of base member 52 is a bearing washer 66. The seat carrying frame 64 includes a bracket 68 which is attached with the back portion of seat 22. The forward portion of the seat portion 62 is secured to the forward portion of the seat carrying frame 64 by means of a bolt 70 received in a slot 74 in seat frame 64 and secured thereto by a wingnut 72.

Figure 5:
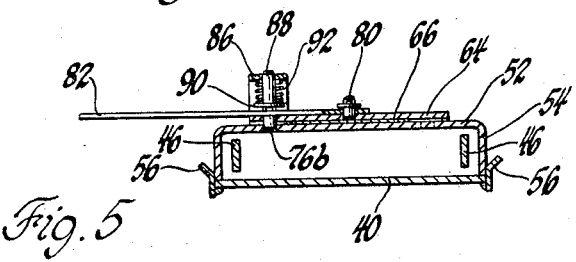
FIG. 5 is a sectional view taken on line 5—5 of FIG. 4.

Base member 52 is formed with two sets of positioning holes 76 and 78 (FIG. 4). Positioning holes 76 and 78 are disposed near diagonally opposite corners of base member 52 and include three holes 76a, b and c and 78a, b and c, respectively. Mounted on the seat carrying frame 64 and projecting upwardly therefrom is a pin 80, and a lever 82 is pivotally mounted on pin 80 and extends across the top of the seat carrying frame 64 as shown in FIGS. 4 and 5. A slot 84 is formed in the end of lever 82 for receiving pin 80. Lever 82 is received between the vertical legs of an inverted, U-shaped bracket 86 in which is slideably mounted a stop pin 88 having a collar 90 mounted intermediate its ends. Mounted between collar 90 and the upper wall of the U-shaped bracket 86 is a spring 92 which biases collar 90 into engagement with lever 82 to urge the pin 88 through an opening provided in lever 82 into one of the positioning holes, the pin being received in positioning hole 76b in FIGS. 4 and 5. With pin 88 in hole 76b of base member 52, seat 22 is in its forwardly facing, driving position shown in solid lines in FIG. 1.

By pulling upwardly on the outer end of lever 82, pin 88 may be withdrawn from hole 76b permitting frame 64 to be rotated about the vertical axis of pivot bolt 62. In the illustrated embodiment, the seat is rotated 180 degrees to bring stop pin 88 into registry with hole 78b in which position seat 22 will be in its rearwardly facing position. In the latter position, when base member 52 is carried by links 42 and 46 to the upper support member 28 as shown in FIG. 3, the seat is in its backhoe operating position.

Seat 22 may be adjusted longitudinally on base member 52 by removing pivot bolt 62 from the central pivot hole 94b in base member 52 (FIG. 4) and reinserting it into either pivot hole 94a or 94c. Stop pin 88 may then be inserted in opening 76a or c in its forwardly facing positions or in openings 78a or c in the rearwardly facing position.

For driving the tractor of FIG. 1, seat 22 is rotated to its forwardly facing position with pin 88 received in one of holes 76a, b, or c. When the tractor and backhoe assembly is in position for excavating or other earthworking operations, the operator lifts base member 52 upwardly and rearwardly about the pivot points 44 and 48 of parallel links 42 and 46 until the base member comes to rest on the upper support member 28. Guide members 36 prevent lateral shifting of the base member on support member 28. Lever 82 is then pulled upwardly to withdraw pin 88 from the hole 76 in which it is received in the forward position, and the seat carrying frame 24 is rotated 180 degrees until pin 88 comes into registry with the appropriate hole 78 to lock the frame in its rearwardly facing backhoe operating position. The inclination of the parallel links 42 and 46 is such that upward movement is required to move base member 52 from the upper support 28. Consequently, the weight of the operator prevents the seat from being accidentally removed from the upper support member 28.

While in the illustrated embodiment, the seat assumes forwardly and rearwardly facing positions only, it is apparent that intermediate positions may be provided by providing additional positioning holes appropriately positioned on base member 52. Moreover, it should be understood that the terms "forward" and "rearward" are for reference purposes only and are not to be construed in a limiting sense.

While one specific embodiment of the invention has been described and illustrated in the accompanying drawings, it should be understood that the invention covers all equivalents and variations in the construction and arrangement of parts falling within the scope and spirit of the invention as defined by the appended claims.

What is claimed is:

1. A vehicle seat assembly comprising: a frame having horizontally spaced upper and lower supports, a pair of parallel links having their lower ends pivotally connected at spaced points to said frame, a base member carried by the upper ends of said parallel links for movement between a first position in which said base member rests on said lower support with said parallel links disposed substantially horizontally along said frame and a second position in which said base member rests on said upper support with said parallel links inclined upwardly and toward said upper support such that the upper ends of said links must initially move upwardly about their lower ends upon return movement of said base from said upper support toward said lower support, a seat supporting frame mounted on said base member for selective rotational movement about a vertical axis between oppositely facing positions, and guide means on said upper and lower supports engageable with the base member to prevent lateral shifting of the base member on said supports.

2. A vehicle seat assembly comprising: a frame having horizontally spaced upper and lower supports, a pair of links pivotally connected to said frame at spaced points thereon, a base member carried by said links for movement between a first position in which said base member rests on said lower support with said links substantially horizontally disposed and a second position in which said base member rests on said upper support with said links inclined upwardly and toward said upper support such that said links initially move upwardly upon return movement of said base from said upper support toward said lower support, a seat supporting frame mounted on said base member for rotational movement about a vertical axis, a lever mounted on said seat supporting frame for pivotal movement about a vertical axis, aligned openings in said lever and base member spaced radially from said last named vertical axis, a pin slideably mounted in said aligned openings, a pair of positioning holes in said base member spaced from said last named vertical axis and from each other, said seat supporting frame being rotatable between selected positions on said base member to bring said aligned openings into registry with one of said positioning holes, spring means biasing said pin into engagement with the selected positioning hole to lock the seat supporting frame against rotation, and said lever being movable vertically against said spring to selectively withdraw said pin from said positioning hole to release the seat supporting frame for rotation from said selected position.

3. A vehicle seat assembly comprising: a frame including an inverted U-shaped member having a horizontal portion with a pair of depending legs, said horizontal portion defining an upper support; a plate secured to said U-shaped member between the depending legs thereof and having a portion projecting from between said legs to define a horizontal lower support spaced vertically and horizontally from said upper support, a first pair of links pivotally mounted at one end on opposite ones of said depending legs; a second pair of links pivotally mounted on opposite sides of said lower support; a base member having depending sides; the other ends of said first and second pairs of links being pivotally connected at spaced points to the depending sides of said base member such that said first and second pairs of links are in parallel relationship; said base member being supported by said links on said frame for movement between a first position in which said base member rests on said lower support with said links projecting substantially horizontally toward said lower support from their pivotal connections with said frame, and a second position in which said base member rests on said upper support with said links inclined upwardly and toward said upper support such that upward movement of said other ends of said links about said one ends thereof is required to move the base member from the upper and lower supports; a seat mounted on said base member for rotation about a vertical axis; a plurality of spaced positioning holes in said base member; a pin carried by said seat; means biasing said pin to project into a selected one of said positioning holes depending upon the position of said seat to lock the seat against rotation from said position; and means for selectively withdrawing said pin from said selected positioning hole to release the seat for rotation.

References Cited by the Examiner

UNITED STATES PATENTS

| | | | |
|---|---|---|---|
| 1,143,195 | 6/1915 | Henderson | 297—349 X |
| 2,721,604 | 10/1955 | Salvadore et al. | 248—425 |
| 2,877,825 | 3/1959 | Olson | 248—376 |
| 2,946,373 | 7/1960 | McCanse et al. | 248—421 |
| 3,243,228 | 3/1966 | Watts et al. | 297—92 |

CLAUDE A. LE ROY, *Primary Examiner.*

R. P. SEITTER, *Assistant Examiner.*